(12) United States Patent
Nam

(10) Patent No.: US 10,186,047 B2
(45) Date of Patent: Jan. 22, 2019

(54) APPARATUS AND METHOD FOR GENERATING A DEPTH MAP

(71) Applicant: ELECTRONICS AND TELECOMMUNICATIONS RESEARCH INSTITUTE, Daejeon (KR)

(72) Inventor: Seung-Woo Nam, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 225 days.

(21) Appl. No.: 14/710,716

(22) Filed: May 13, 2015

(65) Prior Publication Data

US 2016/0042518 A1    Feb. 11, 2016

(30) Foreign Application Priority Data

Aug. 5, 2014 (KR) ..................... 10-2014-0100503

(51) Int. Cl.
*G06T 7/00* (2017.01)
*G06T 7/50* (2017.01)

(52) U.S. Cl.
CPC ...... *G06T 7/50* (2017.01); *G06T 2207/10016* (2013.01); *G06T 2207/20092* (2013.01)

(58) Field of Classification Search
None
See application file for complete search history.

(56) References Cited

U.S. PATENT DOCUMENTS

| 8,571,304 | B2 | 10/2013 | Kim et al. |
| 2013/0063430 | A1* | 3/2013 | Kwon ............... H04N 13/0271 345/419 |
| 2013/0127823 | A1* | 5/2013 | Diverdi ................ G06T 17/10 345/419 |
| 2013/0236099 | A1 | 9/2013 | Yu et al. |
| 2013/0266292 | A1 | 10/2013 | Sandrew et al. |

(Continued)

FOREIGN PATENT DOCUMENTS

| KR | 10-2013-0027836 A | 3/2013 |
| KR | 10-2013-0102895 A | 9/2013 |

(Continued)

OTHER PUBLICATIONS

Yong Ju Jung et al., "A novel 2D-to-3D conversion technique based on relative height depth cue", Proceedings of SPIE-IS-&T Electronic Imaging, vol. 7237 pp. 72371U-1~72371U-8, 2009.

(Continued)

*Primary Examiner* — Yingchun He
(74) *Attorney, Agent, or Firm* — LRK Patent Law Firm

(57) ABSTRACT

An apparatus for generating a depth map includes a communication interface configured to receive video; a processor configured to generate depth map of the video according to a predetermined instruction; and a memory configured to store the instruction, wherein the instruction comprises instructions configured to perform: receiving an input to set a start point and an end point; providing a reference figure corresponding to the start point and the end point; and generating a depth map corresponding to the reference figure.

10 Claims, 9 Drawing Sheets

(56) References Cited

U.S. PATENT DOCUMENTS

2014/0111507 A1    4/2014   Kim et al.
2014/0210944 A1*   7/2014   Jeong ................. H04N 13/0264
                                                              348/43

FOREIGN PATENT DOCUMENTS

KR           10-1356544 B1    2/2014
KR       10-2014-0052792 A    5/2014

OTHER PUBLICATIONS

Chao-Chung Cheng et al., "Hybrid Depth Cueing for 2D-to-3D Conversion System", Proceedings of SPIE-IS-&T Electronic Imaging, vol. 7237 pp.723721-1~723721-8, 2009.

* cited by examiner 710  720

810  820

FIG. 9
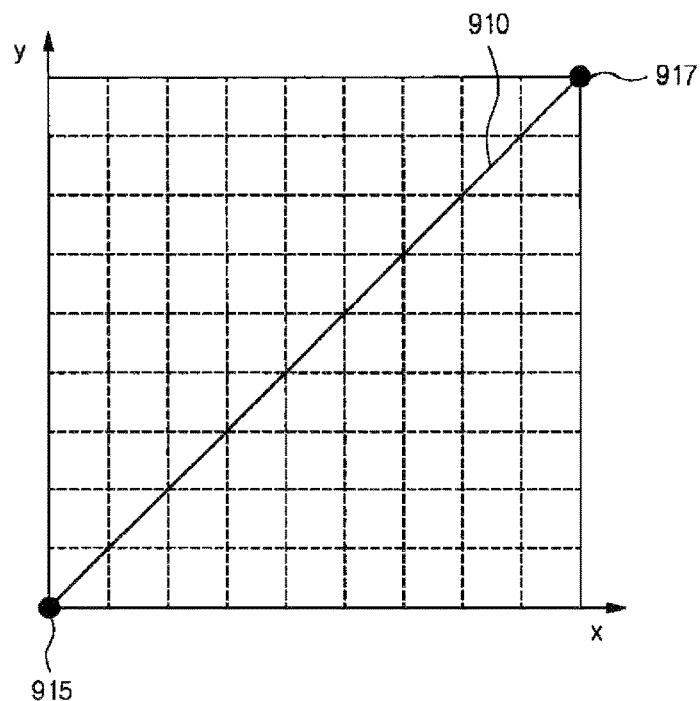
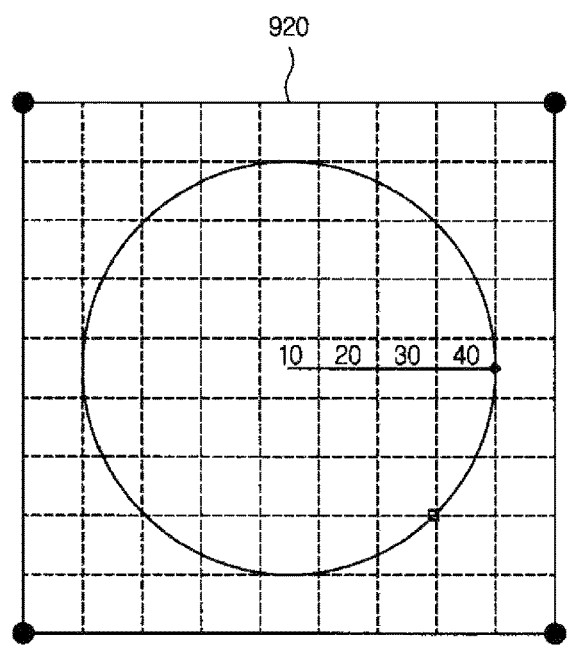

FIG. 10
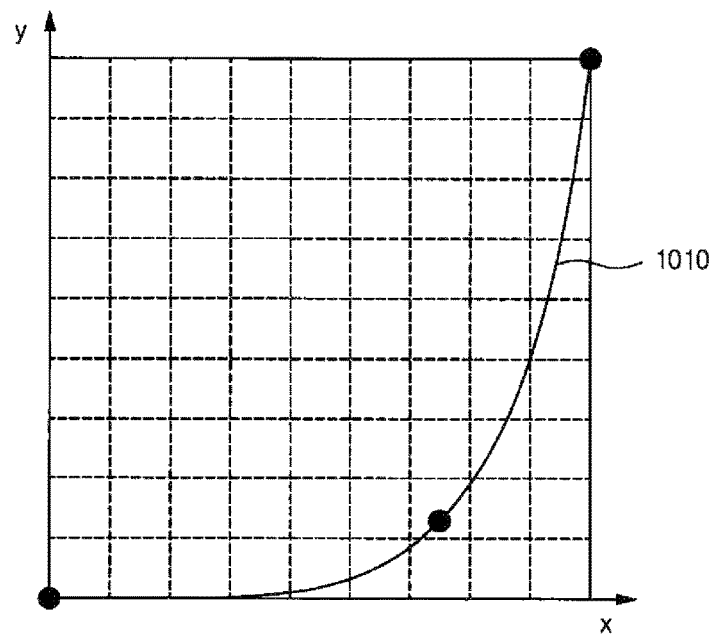
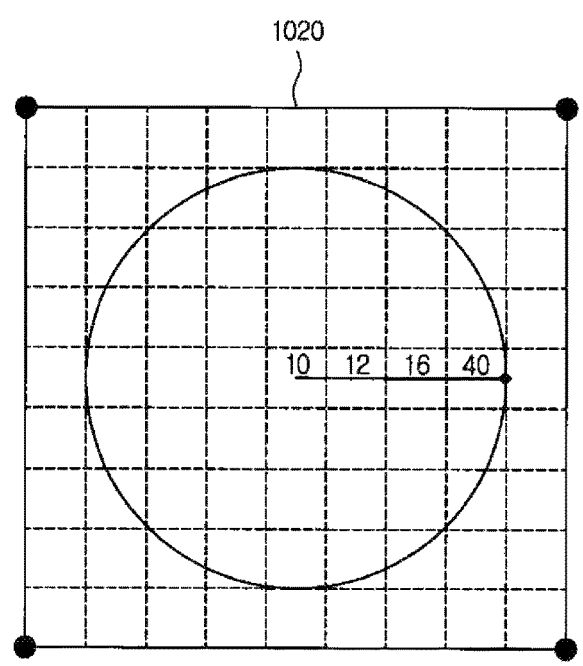

FIG. 11
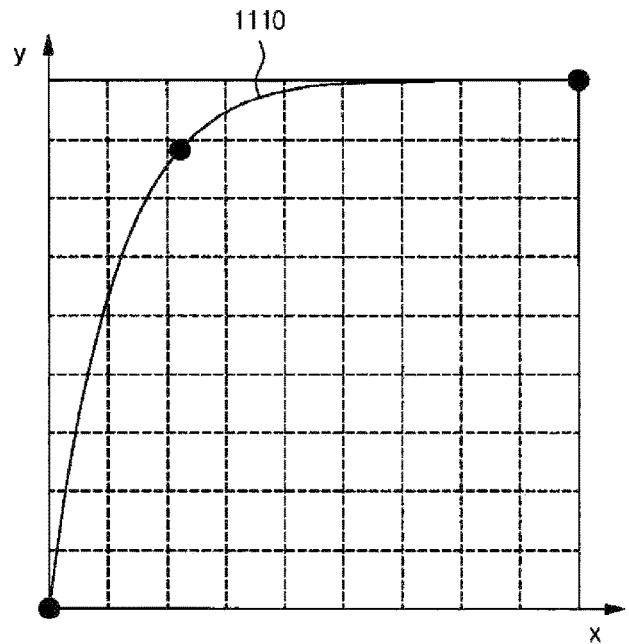
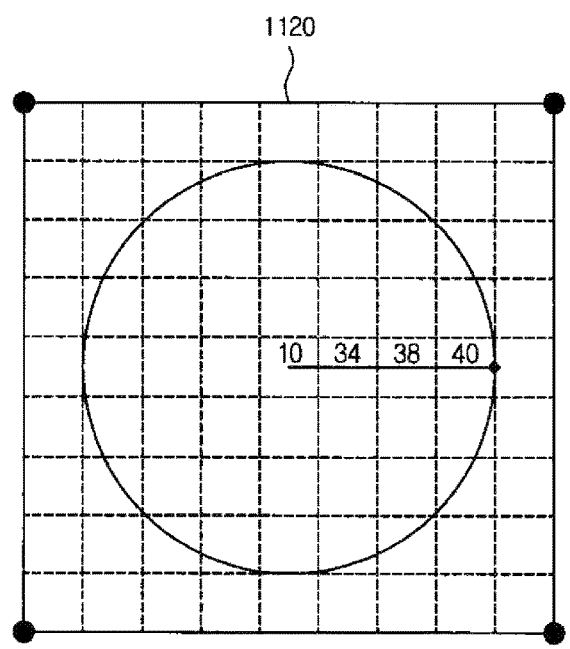

APPARATUS AND METHOD FOR GENERATING A DEPTH MAP

CROSS REFERENCE TO RELATED APPLICATION

This application claims the benefit of Korean Patent Application No. 10-2014-0100503, filed on Aug. 5, 2014, entitled "Apparatus and method for generating a depth map", which is hereby incorporated by reference in its entirety into this application.

BACKGROUND OF THE INVENTION

1. Technical Field

The present invention relates to a technology for generating a depth map from a video and more particularly, to a technology for generating a depth map of video according to a user's input.

2. Description of the Related Art

There are various methods for generating and editing a depth map from 2D video but many parts are carried manually.

There is a 3D mesh method for obtaining a depth map manually from 2D video, but it requires time and effort for generating a model at the beginning and editing it. There is also a painting method for generating a depth map but it can cause flickering problem since it is difficult to generate and edit depth maps consistently between image frames for image sequence when the depth map is generated by the painting method.

SUMMARY OF THE INVENTION

An object of the present invention is to provide an apparatus for generating a depth map which generates a depth map through a user's input.

According to an aspect of the present invention, there is provided an apparatus for generating a depth map comprising: a communication interface configured to receive video; a processor configured to generate a depth map of the video according to a predetermined instruction; and a memory configured to store the instruction, wherein the instruction may comprise instructions configured to perform: receiving an input to set a start point and an end point; providing a reference figure corresponding to the start point and the end point; and generating a depth map corresponding to the reference figure.

The step for generating a depth map corresponding to the reference figure may, when the reference figure is any one of circular reference figure, linear reference figure and cylindrical reference figure, comprise: receiving an input to set a control line; identifying a depth value corresponding to a relative distance of the distance between each point of the video and a start reference point to the distance from the start reference point of the reference figure to an end reference point by referring to the control line; setting the depth value corresponding to the relative distance between the point and the start reference point as a depth value of the point; and generating a depth map comprising the depth value of each point.

The control line may be a line indicating a depth value for the relative distance.

The circular reference figure may be a circle in which the start point is the center and the end point is one point on the circumference; and the start reference point of the circular reference figure may be the start point, and the end reference point of the circular reference figure may be each point on the circumference.

The linear reference figure may be a segment having the start point as one end and the end point as the other end; the start reference point of the linear reference figure may be a point which is at right angles to the segment and is on a straight-line passing the start point; and the end reference point of the linear reference figure may be a point which is at right angles to the segment and is on a straight-line passing the end point.

The cylindrical reference figure may be a figure including a rectangle which includes one side centering around the start point and another side centering around the end point and a segment which connects between the start point and the center point; and the start reference point of the cylindrical reference figure may be a center line which connects between the start point and the end point, and the end reference point of the cylindrical reference figure may be two sides of the quadrangle which are not at right angles to the center line.

The step for generating a depth map corresponding to the reference figure may, when the reference figure is a quadrangle reference figure, comprise: receiving a depth value of each vertex of the quadrangle reference figure; calculating a depth value for each point of the quadrangle reference figure by assuming that the quadrangle reference figure is a plane; and generating a depth map comprising the depth value of each point of the quadrangle reference figure, which matches to the depth value corresponding to each point of the video, as a depth value of each point of the video.

The quadrangle reference figure is a rectangle comprising one side centering around the start point and another side centering around the end point, or a quadrangle in which each vertex position of the rectangle is changed according to a user's input.

According to another aspect of the present invention, there is provided a method for generating a depth map in a method for generating a depth may by an apparatus for generating a depth map, the method comprising: receiving an input to set a start point and an end point; calculating a reference figure corresponding to the start point and the end point; and generating a depth map corresponding to the reference figure.

The step for generating a depth map corresponding to the reference figure may, when the reference figure is any one of circular reference figure, linear reference figure and cylindrical reference figure, comprise: receiving an input to set a control line; identifying a depth value corresponding to a relative distance of the distance between each point of the video and a start reference point to the distance from the start reference point of the reference figure to an end reference point by referring to the control line; setting the depth value corresponding to the relative distance between the point and the start reference point as a depth value of the point; and generating a depth map comprising the depth value of each point.

The control line may be a line indicating a depth value for the relative distance.

The circular reference figure may be a circle in which the start point is the center and the end point is one point of the circumference; and the start reference point of the circular reference figure may be the start point, and the end reference point of the circular reference figure may be each point on the circumference.

The linear reference figure may be a segment having the start point as one end and the end point as the other end, the start reference point of the linear reference figure may be a point which is at right angles to the segment and is on a straight-line passing the start point, and the end reference point of the linear reference figure may be a point which is at right angles to the segment and is on a straight-line passing the end point.

The cylindrical reference figure may be a figure including a rectangle which includes one side centering around the start point and another side centering around the end point and a segment which connects between the start point and the center point; and the start reference point of the cylindrical reference figure may be a center line which connects between the start point and the end point, and the end reference point of the cylindrical reference figure may be two sides of the quadrangle which are not at right angles to the center line.

The step for generating a depth map corresponding to the reference figure may, when the reference figure is a quadrangle reference figure, comprise: receiving a depth value of each vertex of the quadrangle reference figure; calculating a depth value for each point of the quadrangle reference figure by assuming that the quadrangle reference figure is a plane; and generating a depth map comprising the depth value of each point of the quadrangle reference figure, which matches to the depth value corresponding to each point of the video, as a depth value of each point of the video.

The quadrangle reference figure may be a rectangle comprising one side centering around the start point and another side centering around the end point, or a quadrangle in which each vertex position of the rectangle is changed according to a user's input.

According to an embodiment of the present invention, a user can quickly and easily perform an input to generate a depth map.

According to an embodiment of the present invention, flicker phenomenon can be prevented by providing a consistent depth map for video.

BRIEF DESCRIPTION OF DRAWING

FIG. 9 illustrates a linear control line set by an apparatus for generating a depth map according to an embodiment of the present invention and depth information set based on the linear control line.

FIG. 10 illustrates an example of a non-linear control line set by an apparatus for generating a depth map according to an embodiment of the present invention and depth information set based on the linear control line.

FIG. 11 illustrates another example of a non-linear control line set by an apparatus for generating a depth map according to an embodiment of the present invention and depth information set based on the linear control line.

DESCRIPTION OF THE EXEMPLARY EMBODIMENTS

The present invention will be described with reference to particular embodiments, it is however to be appreciated that various changes and modifications may be made by those skilled in the art without departing from the spirit and scope of the present invention, as defined by the appended claims and their equivalents.

Throughout the description of the present invention, when describing a certain technology is determined to evade the point of the present invention, the pertinent detailed description will be omitted. While such terms as "first" and "second," etc., may be used to describe various components, such components must not be limited to the above terms. The above terms are used only to distinguish one component from another.

When one element is described as being "connected" or "accessed" to another element, it shall be construed as being connected or accessed to the other element directly but also as possibly having another element in between.

Hereinafter, certain embodiments of the present invention will be described with reference to the accompanying drawings, in which those components are rendered the same reference number that are the same or are in correspondence, regardless of the figure number, and redundant explanations are omitted.

Figure 1:
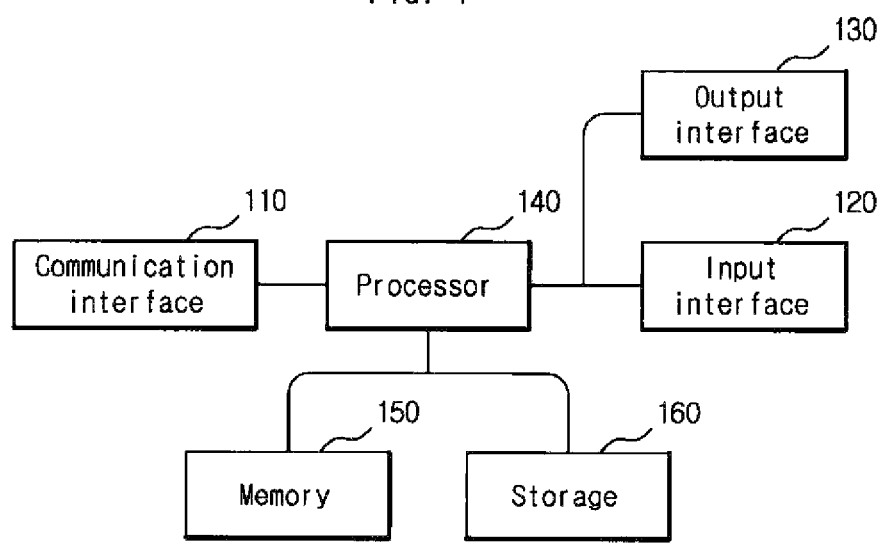
FIG. 1 is a block view illustrating an apparatus for generating a depth map according to an embodiment of the present invention.

FIG. 1 is a block view illustrating an apparatus for generating a depth map according to an embodiment of the present invention.

Referring to FIG. 1, an apparatus for generating a depth map includes a communication interface 110, an input interface 120, an output interface 130, a processor 140, a memory 150 and a storage 160.

The communication interface 110 receives a video from an external device through a wireless communication method or a communication method using a specified terminal. Here, the video received from the external device may be 2-dimensional video which does not include depth information. The communication interface 110 may also output a depth map generated to be corresponded to the video to the external device.

The input interface 120 receives a user's, input from an input device such as a touch pad, mouse and the like. Type of user's input will be explained in detail below.

The output interface 130 outputs images through a display such as a monitor and the like. Here, the image outputted from the output interface 130 is an image including user's interface for generating a depth map and is going to be explained below in detail.

The processor 140 performs a process for generating a depth map of the video according to stored instructions.

The memory 150 stores instructions for generating a depth map which can be interpreted by the processor 140 by loading from the storage 160. The memory 150 may be a volatile memory such as random access memory (RAM) and the like.

The storage 160 may store instructions and video received through the communication interface 110.

Hereinafter, a method for generating a depth map by the apparatus for generating a depth map will be described in more detail.

Figure 2:
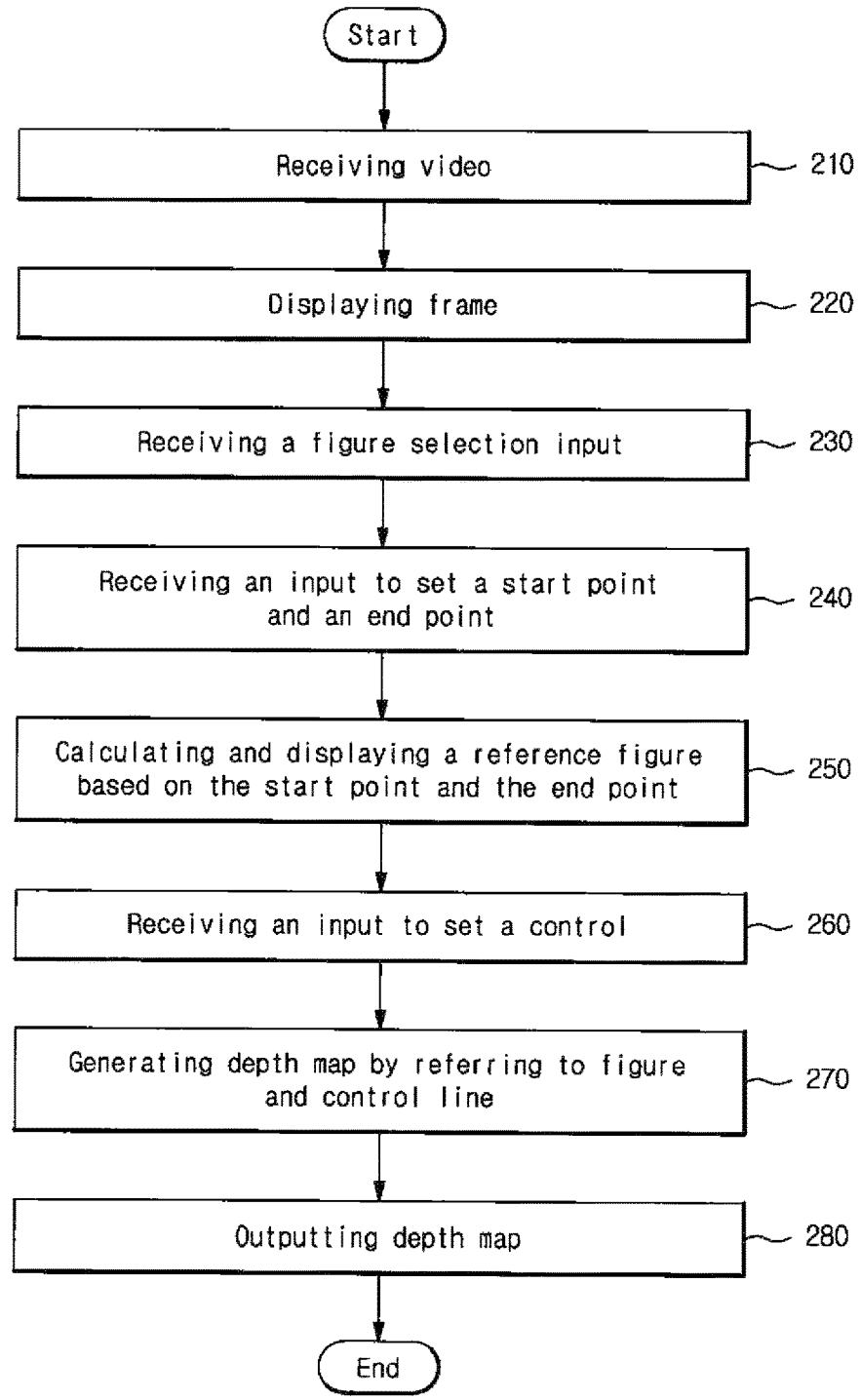
FIG. 2 is a flowchart illustrating a process for generating a depth map by an apparatus for generating a depth map according to an embodiment of the present invention.

FIG. 2 is a flowchart illustrating a process for generating a depth map by an apparatus for generating a depth map according to an embodiment of the present invention. Each process to be explained below is a process performed by the processor 140 of the apparatus for generating a depth map, but a subject in each step is commonly called an apparatus for generating a depth map for clear and concise description. General processes in a computer device such as a process for accessing to instructions stored in the memory 150 by the processor 140 and the like are omitted.

Referring to FIG. 2, in S210, the apparatus for generating a depth map receives a video through the communication interface 110.

In S220, the apparatus for generating a depth map indicates an assigned frame of the video.

In S230, the apparatus for generating a depth map receives a figure selection input to select a reference figure from a user through the input interface 120. For example, the apparatus for generating a depth map may receive a figure selection input to select any one of a circular reference figure, a linear reference figure, a cylindrical reference figure and a quadrangle reference figure. Here, the reference figure may be a figure which represents a reference to set depth on an area of a specific object and may be one of a circular reference figure, a linear reference figure, a cylindrical reference figure and a quadrangle reference figure. The apparatus for generating a depth map may receive a figure selection input by displaying a user interface in S220.

In S240, the apparatus for generating a depth map receives an input to set a start point and an end point from a user through the input interface 120. For example, the apparatus for generating a depth map may set a point, where the user clicks a mouse through the input interface 120, as the start point and a point, where the user drags and releases, as the end point. Here, an input method to set the start point and the end point by the user may vary with implement methods.

In S250, the apparatus for generating a depth map calculates a reference figure based on the start point and the end point and displays the calculated reference figure on a frame. A process for calculating reference figure based on the start point and the end point and displaying the result will be explained with reference to FIG. 4 to FIG. 8 below in detail.

In S260, the apparatus for generating a depth map receives an input to set a control line through the input interface 120. Here, the control line is a line indicating depth change from the start reference point of the reference figure to the end reference point.

In S270, the apparatus for generating a depth map sets a depth value by referring to the figure and the control line for the object image area of the video which is positioned in the figure calculated in S250 to generate a depth map. A process for setting a depth value based on the control line will be explained in detail with reference to FIG. 9 to FIG. 12.

In S280, the apparatus for generating a depth map outputs a depth map to an external device through the communication interface 110.

Figure 3:
FIG. 3 illustrates an example of a frame of video which an apparatus for generating a depth map according to an embodiment of the present invention displays.
Figure 4:
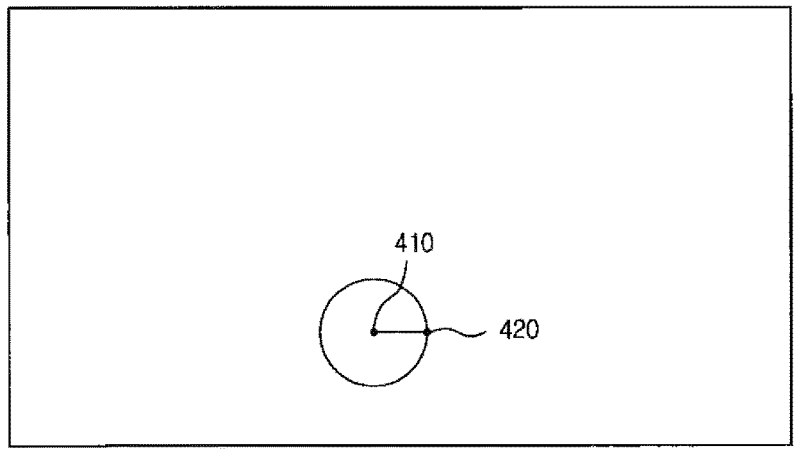
FIG. 4 illustrates an example of a circular reference figure which an apparatus for generating a depth map according to an embodiment of the present invention displays.
Figure 5:
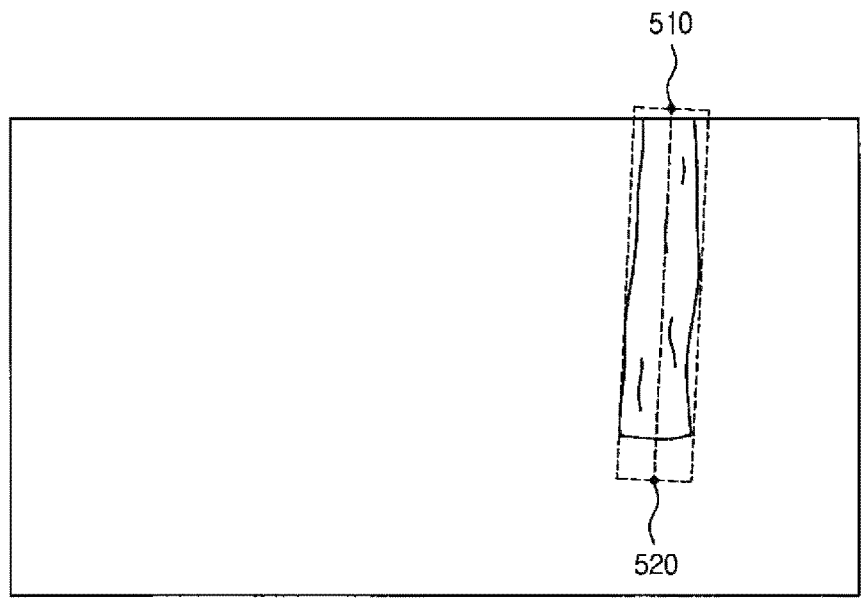
FIG. 5 illustrates an example of a cylindrical reference figure which an apparatus for generating a depth map according to an embodiment of the present invention displays.
Figure 6:
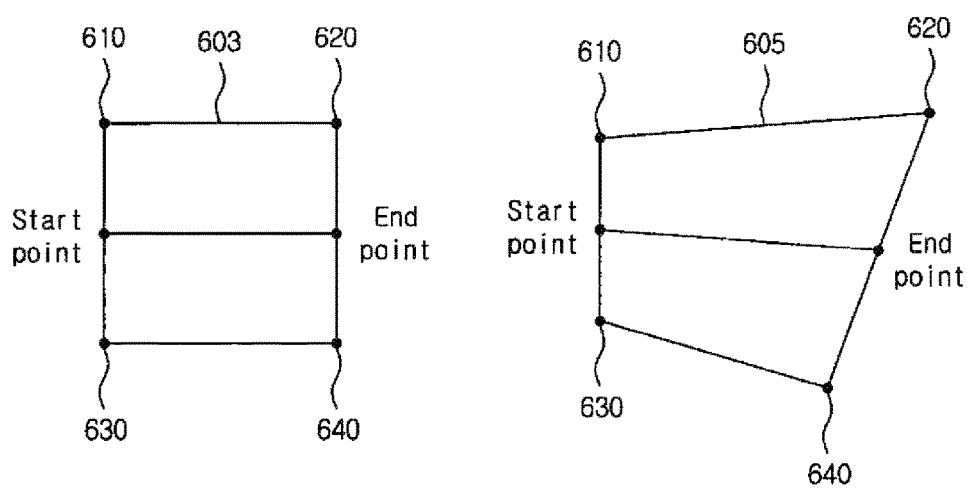
FIG. 6 illustrates an example of a quadrangle reference figure which an apparatus for generating a depth map according to an embodiment of the present invention displays.
Figure 7:
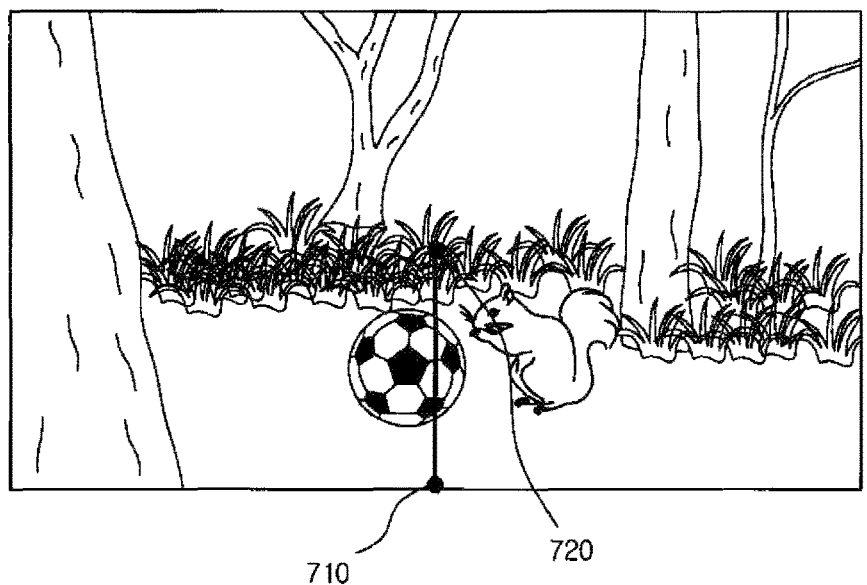
FIG. 7 illustrates an example of a linear reference figure which an apparatus for generating a depth map according to an embodiment of the present invention displays.
Figure 8:
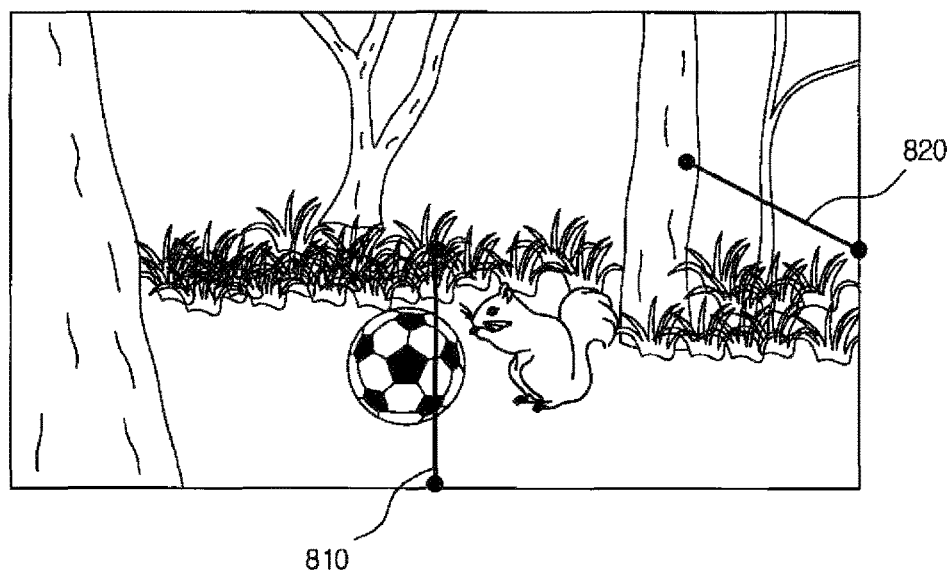
FIG. 8 illustrates another example of a linear reference figure which an apparatus for generating a depth map according to an embodiment of the present invention displays.

FIG. 3 illustrates an example of a frame of video which an apparatus for generating a depth map according to an embodiment of the present invention displays. FIG. 4 illustrates an example of a circular reference figure which an apparatus for generating a depth map according to an embodiment of the present invention displays. FIG. 5 illustrates an example of a cylindrical reference figure which an apparatus for generating a depth map according to an embodiment of the present invention displays. FIG. 6 illustrates an example of a quadrangle reference figure which an apparatus for generating a depth map according to an embodiment of the present invention displays. FIG. 7 illustrates an example of a linear reference figure which an apparatus for generating a depth map according to an embodiment of the present invention displays. FIG. 8 illustrates another example of a linear reference figure which an apparatus for generating a depth map according to an embodiment of the present invention displays.

The apparatus for generating a depth map may display a frame of a video as shown in FIG. 3 and receive a figure selection input from a user.

When the figure selection input is received to select a circular reference figure, the apparatus for generating a depth map calculates a circle as a reference figure in which a start point 410 according to a user's input is the center of the circle and an end point 420 is a point on the circumference. The apparatus for generating a depth map may display the circular reference figure on the frame as shown in FIG. 4.

When the figure selection input is received to select a cylindrical reference figure, the apparatus for generating a depth map calculates a cylindrical reference figure including a rectangle in which a start point 510 according to a user's input is the center of one side edge and an end point 520 is the center of the other side edge, and a straight-line (hereinafter, referred to as center line) which connects the start point and the end point. The apparatus for generating a depth map may display the cylindrical reference figure on the frame as shown in FIG. 5.

In addition, the apparatus for generating a depth map calculates a quadrangle reference figure which is a rectangle in which a start point according to a user's input is the center of one side edge and an end point is the center of another side edge as the left figure 603 in FIG. 6, Here, the apparatus for generating a depth map may transform the quadrangle reference figure by transforming into a quadrangle of which shape is different from the original rectangle according to an input to move one of vertexes (610, 620, 630, 640) of the rectangle as the right figure 605. The apparatus for generating a depth map may also receive a depth value of each vertex according to a user's input. Here, the apparatus for generating a depth map may calculate a depth value of each point of the object which is located on the quadrangle reference figure based on the depth value of each vertex in which it is assumed that the quadrangle reference figure is a plane. When the quadrangle reference figure is calculated, the apparatus for generating a depth map may omit the step of S260 and perform S270 in FIG. 2 to interpolate the depth value of each point of the plane quadrangle reference figure using a known method and set a depth value for each point of the object on the quadrangle reference figure based on each interpolated depth value.

When the figure selection input is received to select a linear reference figure, the apparatus for generating a depth map calculates a linear reference figure which is a straight-line in which a start point 710 according to a user's input is one end and an end point 720 is the other end. The apparatus for generating a depth map may display the linear reference figure on the frame as shown in FIG. 7.

Here, the apparatus for generating a depth map may calculate a plurality of linear reference figures according to a user's input. For example, the apparatus for generating a depth map may display a first linear reference figure 810 and a second linear reference figure 820 on the frame according to a user's input to set the first linear reference figure 810 and the second linear reference figure 820 as shown in FIG. 8.

FIG. 9 illustrates a linear control line set by an apparatus for generating a depth map according to an embodiment of the present invention and depth information set based on the linear control line. FIG. 10 illustrates an example of a non-linear control line set by an apparatus for generating a depth map according to an embodiment of the present invention and depth information set based on the linear control line. FIG. 11 illustrates another example of a non-linear control line set by an apparatus for generating a depth map according to an embodiment of the present invention and depth information set based on the linear control line.

Referring to FIG. 9, the apparatus for generating a depth map may set a control line 910 which is linearly increasing according to a user's input. Here, x-axis in a coordinate system of the control line is a relative distance of the distance between a start reference point for an object area and each point on the object area to the shortest distance between the start reference point and an end reference point for the object area, and y-axis is a depth value to be set on the frame for the point corresponding to each relative distance. Here, the relative distance is a normalized distance for the distance between the start reference point and each point on the object area when the shortest distance between the start reference point and an end reference point is set to a predetermined value (e.g., 1) through the normalization.

One end point 915 of the control line is a depth value of the start reference point of the reference figure and the other end point 917 is a depth value of the end reference point of the reference figure. Here, an input to set the control line may include a depth value input which corresponds to the start reference point, a depth value input which corresponds to the end reference point, and an input to change a shape of the control line. The input to change a shape of the control line may be any input to set a shape of a line through a mouse or a keyboard such as setting Bezier curves. The apparatus for generating a depth map may also set a shape of the control line according to a user's input through any known method.

Here, the start reference point of the circular reference figure is the center of the circle and the end reference point of the circular reference figure is each point on the circumference. The apparatus for generating a depth map determines a depth value of each point located on the straight-line which connects the center of the circle with one point on the circumference based on the control line. The apparatus for generating a depth map may determine depth values of all points located on the straight-line which connects one point on the circumference with the center of the circle.

For example, when a circular reference figure is set for a specific object, the apparatus for generating a depth map may determine a depth value of each point of the object such as 920 based on the circular reference figure and the control line as described above. When the control line of which a depth value increases linearly is set such as 910, the apparatus for generating a depth map may set depth values of the points to have a constant depth value difference between adjacent points among the points from the center of the circle to a point on the circumference as 920.

As another example, when a non-linear control line, of which a depth value change gradually deepened toward the end reference point increases, is set as 1010 in FIG. 10, the apparatus for generating a depth map may set depth values of the points from the center of the circle to one point on the circumference to have greater depth value difference between adjacent points located close to the circumference than that between adjacent points located far from the circumference as 1020.

As another example, when a non-linear control line, of which a depth value change gradually deepened toward the end reference point decreases, is set as 1110 in FIG. 11, the apparatus for generating a depth map may set depth values of the points from the center of the circle to one point on the circumference to have less depth value difference between adjacent points located close to the circumference than that between adjacent points located far from the circumference as 1120.

Figure 12:
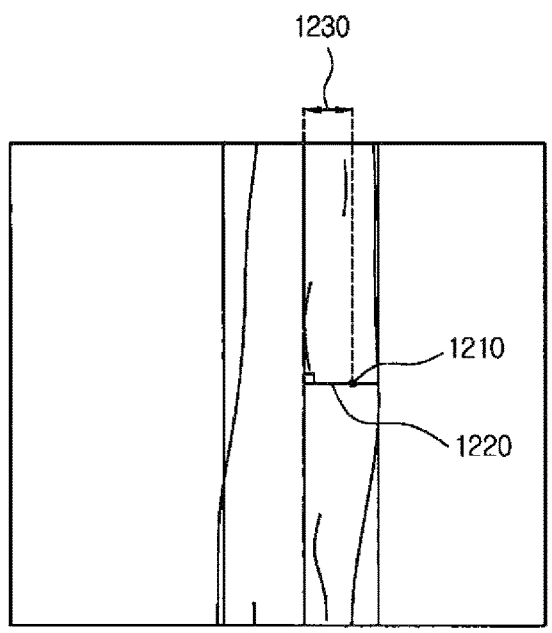
FIG. 12 illustrates a process for setting a depth value according to a cylindrical reference figure by an apparatus for generating a depth map according to an embodiment of the present invention.

FIG. 12 illustrates a process for setting a depth value according to a cylindrical reference figure by an apparatus for generating a depth map according to an embodiment of the present invention.

A start reference point of a cylindrical reference figure is a center line connecting between a start point and an end point, and an end reference point of a cylindrical reference figure is two sides of a quadrangle which are not at right angles to the center line. The apparatus for generating a depth map may identify a depth value, corresponding to a relative distance of the distance between a specific point and one point on the center line (hereinafter, referred to as "segment start point") to the length of a virtual line which is perpendicular to the center line, starts at the segment start point, ends at a point on the side, and passes the specific point, based on the control line. Here, the relative distance is a regularized distance between the start reference point to the specific point 1210 through the regularization of the length 1220 in FIG. 12 to a predetermined value (e.g., 1). The apparatus for generating a depth map may set the depth value identified based on the control line as the depth value for the specific point.

For example, the apparatus for generating a depth map may identify a depth value, corresponding to a relative distance of a distance 1230 to a segment distance 1220 which is perpendicular to the center line, starts at one point on the center line (hereinafter, referred to as "segment start point"), ends at a point on the side, and passes a point 1210, based on the control line 910 in FIG. 9 (in which it is assumed that a linear control line is set). The apparatus for generating a depth map may set the depth value identified based on the control line 910 as a depth value of the point 1210. The apparatus for generating a depth map may set depth values for all the points of the object by the above-described method. The apparatus for generating a depth map may also set depth values of all the points based on various control lines as illustrated in FIG. 10 and FIG. 11 in a manner corresponding to the cylindrical reference figure.

Figure 13:
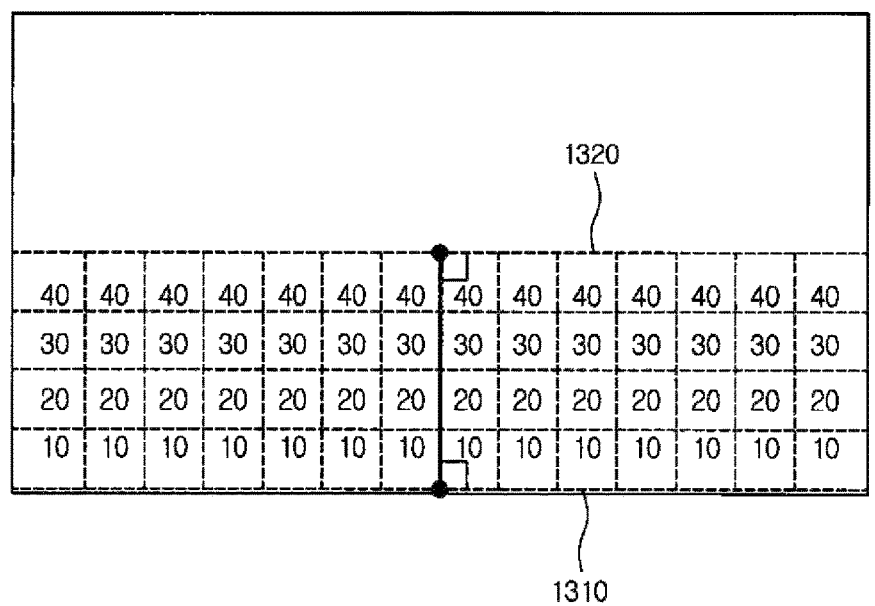
FIG. 13 illustrates depth values set through the linear reference figure by the apparatus for generating a depth map according to an embodiment of the present invention.

FIG. 13 illustrates depth values set through the linear reference figure by the apparatus for generating a depth map according to an embodiment of the present invention.

Referring to FIG. 13, a start reference point of a linear reference figure is a straight-line (hereinafter, referred to as start line) which is at right angles to the linear reference figure and passes a start point, and an end reference point of a linear reference figure is a straight-line (hereinafter, referred to as end line) which is at right angles to the linear reference figure and passes an end point.

The apparatus for generating a depth map may identify a depth value corresponding to a relative distance of the distance between the start line corresponding to the linear reference figure and a specific point to the length of the linear reference figure based on the control line. The apparatus for generating a depth map sets the depth value corresponding to the relative distance as a depth value of the corresponding point.

The apparatus for generating a depth map may set a depth value of each point as shown in FIG. 13.

The apparatus for generating a depth map according to an embodiment of the present invention allows for a user to easily and quickly set a depth value by using a circular reference figure for an object having a spherical 3-dimensional effect such as a ball. The apparatus for generating a depth map according to an embodiment of the present invention also allows for a user to easily and quickly set a depth value by using a cylindrical reference figure for a cylindrical object such as a pillar, a tree trunk and the like.

The apparatus for generating a depth map according to an embodiment of the present invention also allows for a user to easily and quickly set a depth value which is associated with perception of broad plane such as background surface by using a linear reference figure.

The program instruction recorded in the computer readable medium may be specially designed for the present invention or generally known in the art to be available for use. Examples of the computer readable recording medium include a hardware device constructed to store and execute a program instruction, for example, magnetic media such as hard disks, floppy disks, and magnetic tapes, optical media such as CD-ROMs, and DVDs, and magneto-optical media such as floptical disks, read-only memories (ROMs), random access memories (RAMs), and flash memories. In addition, the above described medium may be a transmission medium such as light including a carrier wave transmitting a signal specifying a program instruction and a data structure, a metal line and a wave guide. The program instruction may include a machine code made by a compiler, and a high-level language executable by a computer through an interpreter.

The above described hardware device may be constructed to operate as one or more software modules to perform the operation of the present invention, and vice versa.

While it has been described with reference to particular embodiments, it is to be appreciated that various changes and modifications may be made by those skilled in the art without departing from the spirit and scope of the embodiment herein, as defined by the appended claims and their equivalents.

What is claimed is:

1. An apparatus for generating a depth map, the apparatus comprising:
    a communication interface configured to receive video;
    a processor configured to generate a depth map of the video according to a predetermined instruction; and
    a memory configured to store the instruction, wherein the instruction is configured to perform
        receiving an input to set a start point and an end point, providing a reference figure corresponding to the start point and the end point, and
        generating a depth map corresponding to the reference figure, and
    the generating a depth map corresponding to the reference figure, when the reference figure is any one of circular reference figure, linear reference figure, and cylindrical reference figure, comprises
    receiving an input to set a control line,
    identifying, by referring to the control line, a depth value corresponding to a normalized distance of a distance between each point of the video and a start reference point of the reference figure with respect to a distance between the start reference point and an end reference point of the reference figure,
    setting the depth value corresponding to the normalized distance between the each point and the start reference point as a depth value of the each point, and
    generating a depth map comprising the depth value of the each point.

2. The apparatus of claim 1, wherein the control line is a line indicating the depth value for the normalized distance.

3. The apparatus of claim 1, wherein
    the circular reference figure is a circle in which the start point is the center and the end point is one point of the circumference, and
    the start reference point of the circular reference figure is the start point and the end reference point of the circular reference figure is each point on the circumference.

4. The apparatus of claim 1, wherein
    the linear reference figure is a line segment having the start point as one end and the end point as the other end,
    the start reference point of the linear reference figure is a point on a straight-line perpendicular to the line segment and passing the start point, and
    the end reference point of the linear reference figure is a point on a straight-line perpendicular to the line segment and passing the end point.

5. The apparatus of claim 1, wherein
    the cylindrical reference figure is a figure including a rectangle having a first side with a center at the start point and a second side with a center at the end point and a center line that is a straight-line connecting the start point and the end point, and
    the start reference point of the cylindrical reference figure is on the center line and the end reference point of the cylindrical reference figure is on two sides of the quadrangle parallel to the center line.

6. A method of generating a depth map of a video by an apparatus for generating the depth map, the method comprising:
    receiving a start point and an end point as an input;
    calculating a reference figure corresponding to the start point and the end point; and
    generating a depth map corresponding to the reference figure, wherein
    the generating a depth map corresponding to the reference figure, when the reference figure is any one of circular reference figure, linear reference figure and cylindrical reference figure, comprises:
    receiving an input to set a control line;
    identifying, by referring to the control line, a depth value corresponding to a normalized distance of a distance between each point of the video and a start reference point of the reference figure with respect to a distance between the start reference point and an end reference point of the reference figure;
    setting the depth value corresponding to the normalized distance between the each point and the start reference point as a depth value of the each point; and generating a depth map comprising the depth value of the each point.

7. The method of claim 6, wherein the control line is a line indicating the depth value for the normalized distance.

8. The method of claim 6, wherein
the circular reference figure is a circle in which the start point is the center and the end point is one point of the circumference, and
the start reference point of the circular reference figure is the start point and the end reference point of the circular reference figure is each point on the circumference.

9. The method of claim 6, wherein
the linear reference figure is a line segment having the start point as one end and the end point as the other end,
the start reference point of the linear reference figure is a point on a straight-line perpendicular to the line segment and passing the start point, and
the end reference point of the linear reference figure is a point on a straight-line perpendicular to the line segment and passing the end point.

10. The method of claim 6, wherein
the cylindrical reference figure is a figure including a rectangle having a first side with a center at the start point and a second side with a center at the end point and a center line that is a straight-line connecting the start point and the end point, and
the start reference point of the cylindrical reference figure is on the center line and the end reference point of the cylindrical reference figure is on two sides of the quadrangle parallel to the center line.

* * * * *